W. A. KNIPE.
CEMENTING MACHINE.
APPLICATION FILED APR. 8, 1918.

1,287,700.

Patented Dec. 17, 1918.
2 SHEETS—SHEET 1.

Inventor,
Wm. A. Knipe
by L. H. Harriman
Atty

W. A. KNIPE.
CEMENTING MACHINE.
APPLICATION FILED APR. 8, 1918.
1,287,700.
Patented Dec. 17, 1918.
2 SHEETS—SHEET 2.
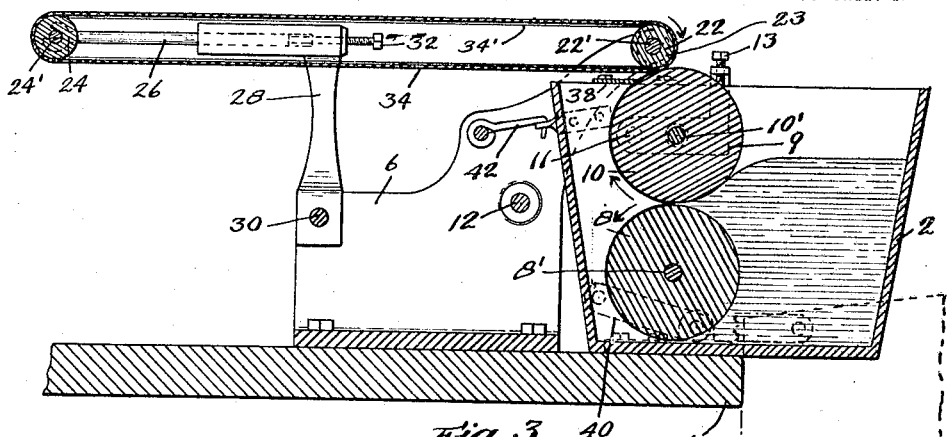
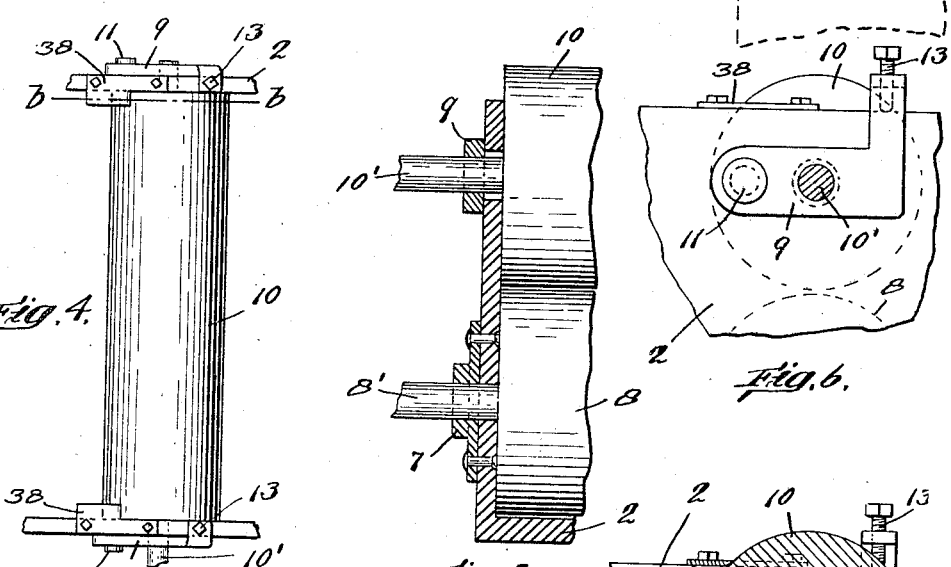
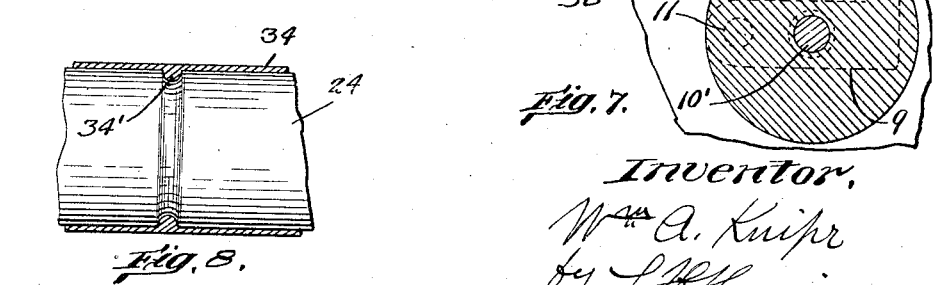
Inventor,
Wm. A. Knipe
by L. H. Harriman
Atty

UNITED STATES PATENT OFFICE.

WILLIAM A. KNIPE, OF HAVERHILL, MASSACHUSETTS.

CEMENTING-MACHINE.

1,287,700.   Specification of Letters Patent.   Patented Dec. 17, 1918.

Application filed April 8, 1918. Serial No. 227,243.

*To all whom it may concern:*

Be it known that I, WILLIAM A. KNIPE, a citizen of the United States, and a resident of Haverhill, in the county of Essex, State of Massachusetts, have invented an Improvement in Cementing-Machines, of which the following is a specification.

This invention relates to certain improvements on the cementing machine shown in my prior Patent #754,074, in which a constantly driven belt is provided, to the surface of which liquid cement is continuously supplied, the cementing operation being performed by placing the work on a horizontally moving portion of the belt. My said prior device was found to be objectionable for several reasons, more particularly and primarily because it applied a too heavy coating of cement to the belt, which resulted in the application of such a heavy coating of cement to the article cemented, as to be objectionable. As these machines are principally useful for "doubling" upper leather, i. e. adhesively connecting a cloth backing thereto, the result was, that aside from the fact that the cement was wasted, the excessive quantity of cement which was applied caused the leather to be stiffened to an objectionable extent, and, where light stock was used, it caused the stock to wrinkle and pucker by reason of the shrinkage of the threads of the cloth.

In the device of my said prior patent, further difficulty was encountered on account of the fact that the surface of the belt was coated unevenly with the cement, and this unevenness was greatly increased by reason of lint becoming lodged against the scraper or "doctor" which was necessarily employed to reduce the amount of cement applied to the belt. The forms of adhesive, now generally used for doubling uppers, are pastes or gums which tend to become lumpy when allowed to stand. That is, small lumps are liable to form in this kind of adhesive, which, if applied to the surface of the doubler, cause small bunches to be formed in the leather.

The objects of my invention are to provide a cementing machine of the belt type, above referred to, in which the cement may be uniformly applied to the surface of the belt in as thin a coating as may be desired; in which all difficulty due to the presence of lint is avoided, and in which all lumps in the paste will be crushed before they can be applied to the belt, so that all possibility that they will be applied to the work will be avoided.

I accomplish these objects by the means hereinafter described and illustrated in the accompanying drawings in which:

Fig. 3 is a longitudinal sectional view thereof on line *a—a* of Fig. 2;

Fig. 4 is a detail view of a cement guard which I preferably employ;

Figs. 5 and 6 are detail views of the upper roll-adjusting means;

Fig. 7 is a detail sectional view on line *b—b* of Fig. 4;

Fig. 8 is a detail view of a belt-guiding means which I preferably employ.

Figure 1:
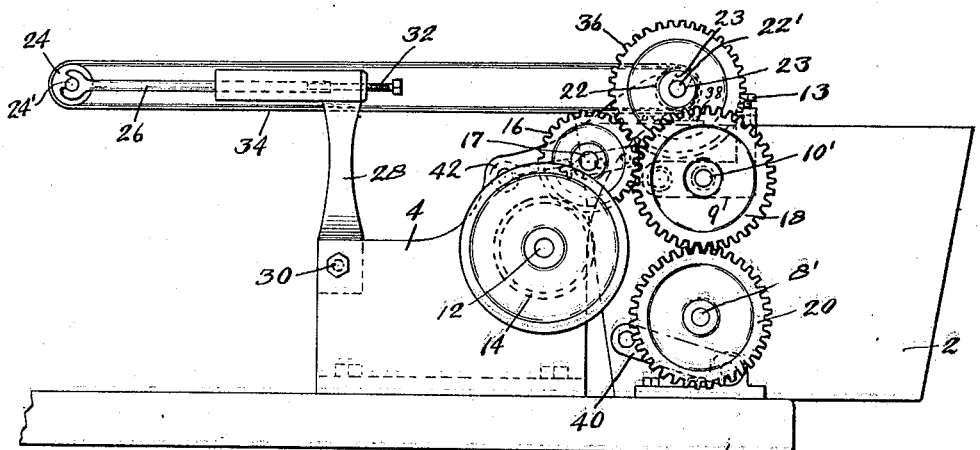
Figure 1 is a side elevation of a preferred embodiment of my invention.
Figure 2:
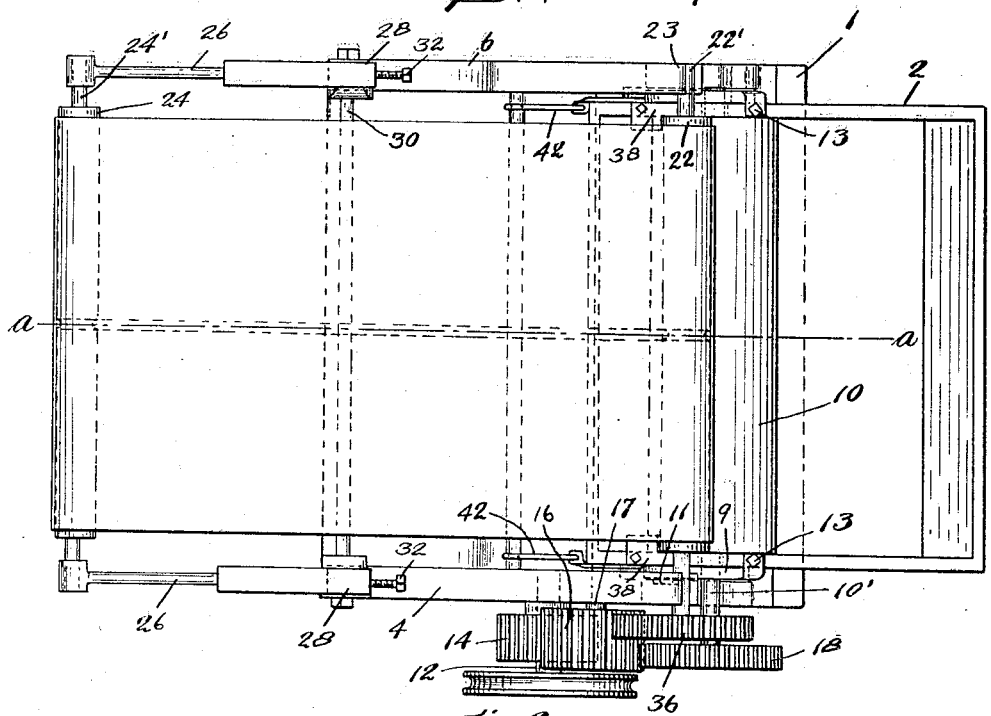
Fig. 2 is a plan view thereof.

As shown in the drawing, the machine comprises a base 1 having an open tank, or receptacle, 2, supported thereon between a pair of upright brackets or supports, 4 and 6, secured thereto. The inner surfaces of the end walls of the receptacle are parallel and vertical and a pair of smooth surfaced, square ended, cylindrical rolls 8 and 10, of uniform length and diameter, are mounted therein, one directly over the other, in parallelism, and with their ends in close proximity to its said inner end surfaces. Said rolls are mounted on shafts 8' and 10', which extend through said end walls, the shaft 8' being journaled in bearings 7, secured on the outer sides of said rolls, in such a position that the cylindrical surface of the roll 8 travels in as close proximity to the bottom of the receptacle, as is practicable, without causing actual frictional engagement. The shaft 10' of the upper roll is journaled in bearing clips 9, disposed on the outer side of each end wall and mounted on pivots 11 therein, said clips being adapted to be swung vertically on said pivot by means of screws 13 bearing on the upper edge of the end walls, to adjust the upper roll with relation to the lower roll, the extent of such adjustment, necessary in practice, being very slight.

The main driving shaft 12 has a gear 14 mounted thereon, which is arranged in mesh with an idle gear 16, journaled on a stud 17, both shaft and stud being mounted in support 4. Gear 16 is arranged in mesh with a gear 18 on the adjacent end of shaft 10' and the gear 18 is arranged in mesh with a gear 20 on the corresponding end of shaft 8' of the lower roll 8.

A roll 22 is mounted on a shaft 22', the ends of which are journaled in bearings 23 formed in the upper end of the supports 4 and 6, said bearings being open at one side to permit the removal of the roll when necessary. A roll 24, of the same size as roll 22, is supported on a shaft 24' journaled in open bearings formed in the ends of rods 26, the latter being horizontally supported and adjustably mounted in sockets formed in the upper ends of bracket arms 28, supported at their lower ends on a rod 30 mounted in the side supports 4 and 6. Adjusting screws 32 are threaded in the opposite ends of said sockets from the ends at which the rods 26 are inserted, in position to engage the ends of said rods, to push them outwardly. A rubber belt 34, having a smooth outer surface is arranged on said rolls 22 and 24 to be carried thereover when the roll 22 is driven, said rolls being arranged at the same level, so that the belt is carried horizontally. The roll 22 is so supported that the belt 34 is driven in contact with the surface of the upper roll 10, at a point somewhat in front of the vertical line through the axis of the roll 10. A gear 36 is mounted on the shaft 22' and is arranged in mesh with the gear 16, which latter is made of sufficient width to engage both gears 18 and 36, so that as thus arranged the belt 34 will be driven in opposition to the surface of the roll 10. As the rolls 8 and 10 are geared directly together, they will be moved in rolling relation, as if their surfaces were positively engaged, and, in practice, the main shaft is driven in the direction to cause said rolls and belt to be driven in the directions of the arrows of Fig. 3, that is, so that the surfaces of rolls 8 and 10 move toward the front, at their meeting point, and the upper section of the belt moves toward the rear. A pair of guards, or scrapers, 38 are secured on the upper edge of the tank, and so arranged that portions thereof are held in engagement with the portions of the end faces of the roll 10 which project above the sides of the receptacle, and in engagement with the roll surface for a short distance from each end, as shown in Figs. 4 and 7. To prevent the belt from running toward either end of the rolls 22 and 24 which carry it, a rib, 34', is formed on the inner side of the belt, in the middle thereof and a correspondingly located circular groove is formed in each roll to receive said rib, as indicated in Fig. 8.

In practice, the portion of the receptacle 2 in the rear of the rolls 8 and 10 is filled with liquid paste up nearly to the level of the axis of the upper roll 10, as indicated in Fig. 3, the rolls and belt being driven continuously in the directions already indicated. As the rolls are held in as close proximity as practicable, at their ends, to the sides of the tank 2, and the lower roll is run in like close proximity to the bottom of the tank and to the upper roll 10, there is but slight leakage of cement possible into the opposite portion of the tank, and if such leakage occurs past the ends, the cement is immediately forced back by the bottom roll at the point where it travels in proximity to the tank bottom, its pumping action to the cement containing portion of the receptacle at this point, being amply sufficient not only to prevent flow of cement beneath it from said portion, but also to return thereto any cement which may leak past the ends of the rolls. As the two rolls, 8 and 10 are run almost, and in some instances in actual rolling contact, only a thin coating of cement will remain on the front surfaces of these rolls. The surface of the roll 10 thus coated, is brought into contact with the belt 34 and, as the latter is driven in contact with, and in opposition to the surface of this roll, it wipes the cement from the roll, the cement being thus transferred to the belt in an equally thin, or thinner, coating, according to the relative speeds at which their surfaces are driven, as determined by the gears.

The operator sits in front of or at one side of the belt and merely lays the doubler on the belt and immediately removes it, as the belt travels, so that a correspondingly light coating of cement is applied to the doubler. The thickness of the coating of cement on the belt always remains constant, except when a portion is removed by placing the work thereon, for as any portion of the belt returns into contact with the roll 10, the cement which has been applied thereto is removed by the roll in the rear of the point of contact with the roll, so that it is returned to the tank, while, at the same time, the belt is removing the cement from the roll in front of the point of contact. It will be apparent, therefore, that the thickness of the coating of cement on the belt at any time is entirely dependent on the thickness of the coating of cement on the front side of the rod 10, and that the thickness of the coating at the latter point is dependent on the proximity of the rolls 8 and 10, so that it follows that the thickness of the coating on the belt, and consequently the thickness of the coating which is to be applied to the work, may be varied by varying the distance between the rolls, this being readily done by means of the adjusting clips 9. Consequently the quantity of cement which will be applied to the work may be reduced to the lowest amount desired, this being a matter of much importance in doubling light weight upper leather.

While the tank may be filled to a level slightly below the level of the upper roll, it is unnecessary that it be filled to an extent more than sufficient to permit it to flow into contact with the lower roll, as the latter will supply cement in sufficient quantity to the upper roll, which will in turn supply it to the belt, so that practically all the cement which is placed in the receptacle may be used up before the latter is refilled.

It will be observed that, as all the cement which is applied to the belt must first pass between the upper and lower rolls, which are mounted to travel in close proximity, all lumpy material in the cement will be crushed, before it is applied to the belt, so that no lumpy cement will be applied to the work at any time.

There is, under some conditions, a tendency for the cement to accumulate on the surface of the upper roll near its ends, beyond the portions which are engaged by the belt. As this surplus cement is liable in time, to work over onto the belt, this difficulty is avoided by employing the scrapers 38, which prevent any substantial accumulation at these points at any time.

As an adhesive of the nature employed will dry over night, it is desirable to remove it from the receptacle and place the parts of the machine to which cement has been applied in water. To provide a convenient means for doing this, the receptacle is pivoted to the base by links 40, so that it may be tipped rearwardly, as indicated by the dotted line position of Fig. 3, hooks 42 being provided on the supports 4 and 6 for holding the receptacle in upright position. In order that the receptacle may be thus emptied, the rolls 22 and 24 must first be removed from their bearings, and when this has been done the receptacle may be tipped back, carrying the gear 18 out of mesh with the gear 16. The receptacle may, after being emptied, be returned to the upright position and filled with water. The hardening of the cement on the machine, when not in use, may thus be prevented.

In ordinary use, more or less lint from the doubler adheres to the belt when it is removed therefrom, which will, in turn, be removed from the belt by the upper roll, and pass into the tank, and become mixed with the cement, after which it is likely to pass onto the roll surface again and be applied to the belt, from which it is likely to be removed by another doubler. In any event, the presence of lint does not, in any way, affect, or interfere with, the operation of the machine.

I claim—

1. A cementing machine comprising a receptacle having a liquid-cement-containing portion, one side of said cement-containing portion being composed of a pair of smooth surfaced rolls disposed in parallelism, one over the other, in close proximity to each other and to the respectively adjacent portions of the bottom and opposite walls of the receptacle, to retain the cement therein, means to drive said rolls in rolling relation outwardly, at their point of proximity, from said cement-containing portion, and an endless cement-carrier arranged to be driven in contact with the surface of the uppermost of said rolls and in opposition thereto, to remove from said surface cement carried thereon from between the rolls, and to return unused cement to said surface.

2. A cementing machine comprising a receptacle having a liquid-cement-containing portion, one side of said portion being composed of a pair of smooth surfaced rolls disposed in parallelism, one over the other, in close proximity to each other and to the respectively adjacent bottom and opposite side walls of the receptacle, means to vary the relative proximity of said rolls and to drive them in rolling relation outwardly, at their points of proximity, from said cement-containing portion, and an endless cement carrier arranged to be driven in contact with the uppermost of said rolls, in opposition thereto and in position to remove from the surface thereof cement carried thereon from between the rolls, and to return the cement to the upper roll, to permit the latter to return the cement to the receptacle.

3. A cementing machine comprising a receptacle having a liquid-cement-containing portion, a bottom roll rotatably mounted therein and having its surface disposed in close proximity to the bottom and sides of said receptacle, an upper roll having its surface disposed in close proximity to, and in parallelism with the surface of said bottom roll, to drive said rolls in rolling relation and in a direction to carry the surface of the bottom roll inwardly at the bottom of the receptacle, with relation to its cement-containing portion, an endless cement-carrier arranged to be driven in contact with the surface of said upper roll and in opposition to the direction of movement of its said surface, to remove the cement therefrom in front of the point of contact of the carrier therewith, after the cement has passed from between said rolls, and to return the cement thereto in the rear of said point of contact.

4. A cementing machine comprising a receptacle for containing liquid cement having one side of its cement-containing portion composed of a pair of smooth surfaced rolls disposed in parallelism one over the other, in close proximity to each other and to the corresponding adjacent portions of the bottom and side walls of the receptacle, to retain the cement in said containing portion thereof to a level above the point of proximity of said rolls, means to drive said rolls in rolling relation outwardly from said containing portion at their point of proximity, an endless cement carrier arranged to be driven in contact with the surface of said rolls and in opposition thereto, to remove from said surface cement carried thereon from between the rolls and to return unused cement to said surface, and a cement guard arranged to engage the end portions of the surface of the upper roll beyond the points of engagement of the carrier therewith.

5. A cementing machine comprising a support having a driving shaft journaled therein, a receptacle, a cement feeding roll journaled in said receptacle, driving means for said roll arranged to be engaged with said driving shaft, a pivotal connection between said receptacle and said support arranged to permit the receptacle to be tilted, to permit it to be emptied, said driving means being arranged to be disengaged from said driving shaft when the receptacle is moved from normal position and to be disengaged therewith when returned to normal position.

In testimony whereof, I have signed my name to this specification.

WILLIAM A. KNIPE.

Copies of this patent may be obtained for five cents each, by addressing the "Commissioner of Patents, Washington, D. C."